(12) United States Patent
Ren et al.

(10) Patent No.: US 10,848,944 B2
(45) Date of Patent: Nov. 24, 2020

(54) INTERNET OF THINGS COMMUNICATION UNIFICATION AND VERIFICATION

(71) Applicant: Verizon Patent and Licensing Inc., Arlington, VA (US)

(72) Inventors: Dahai Ren, Lincoln, MA (US); Dongchen Wang, Concord, MA (US); Ming Chen, Bedford, MA (US); Zhong Chen, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 483 days.

(21) Appl. No.: 14/950,800

(22) Filed: Nov. 24, 2015

(65) Prior Publication Data

US 2017/0149937 A1 May 25, 2017

(51) Int. Cl.
*H04W 4/18* (2009.01)
*H04W 4/70* (2018.01)

(52) U.S. Cl.
CPC ............... *H04W 4/70* (2018.02); *H04W 4/18* (2013.01)

(58) Field of Classification Search
None
See application file for complete search history.

(56) References Cited

U.S. PATENT DOCUMENTS

| 5,896,383 | A * | 4/1999 | Wakeland | H04L 29/06 370/400 |
| 6,047,002 | A * | 4/2000 | Hartmann | H04L 12/42 370/362 |
| 7,383,534 | B1 * | 6/2008 | Agbabian | G06F 8/71 717/108 |
| 8,990,324 | B2 * | 3/2015 | Davis | G06F 8/34 709/206 |
| 9,009,230 | B1 * | 4/2015 | Matthieu | H04L 69/08 709/204 |
| 9,606,817 | B1 * | 3/2017 | Efstathopoulos | G06F 9/45533 |
| 9,654,567 | B2 * | 5/2017 | Dubois | H04L 67/141 |
| 2003/0208622 | A1 * | 11/2003 | Mosier | H04L 41/022 709/244 |
| 2004/0024863 | A1 * | 2/2004 | Connor | G06F 3/0632 709/224 |
| 2004/0114624 | A1 * | 6/2004 | Choi | H04L 69/08 370/466 |
| 2004/0172469 | A1 * | 9/2004 | Takahashi | H04L 43/0817 709/224 |

(Continued)

*Primary Examiner* — Christopher T Wyllie

(57) ABSTRACT

A method, a device, and a non-transitory storage medium provides to receive a packet from an Internet of Things (IoT) device, wherein the packet carries IoT data; determine a classification of the IoT device from which the first packet is received, in response to a receipt of the packet, wherein the classification indicates a type of IoT device; select standard data types assigned to the classification of the IoT device, in response to a determination of the classification of the IoT device; determine whether the IoT data includes all of the standard data types based on the standard data types selected; convert the IoT data into an IoT standard format in response to a determination that the IoT data includes all of the standard data types; generate another packet that includes the IoT data in the IoT standard format in response to a conversion of the IoT data; and transmit the other packet to a network device.

20 Claims, 10 Drawing Sheets

(56) References Cited

U.S. PATENT DOCUMENTS

| | | | |
|---|---|---|---|
| 2006/0239243 A1* | 10/2006 | Li | H04Q 3/0045 370/352 |
| 2007/0067458 A1* | 3/2007 | Chand | G06F 16/258 709/226 |
| 2007/0139218 A1* | 6/2007 | Bovankovich | G01D 4/004 340/870.02 |
| 2007/0139219 A1* | 6/2007 | Crider | G06Q 50/06 340/870.02 |
| 2009/0030821 A1* | 1/2009 | Stegman | G06Q 30/04 705/34 |
| 2010/0128714 A1* | 5/2010 | Kim | H04L 29/12783 370/350 |
| 2014/0244710 A1* | 8/2014 | Sharma | H04L 67/12 709/201 |
| 2015/0058445 A1* | 2/2015 | Choi | H04L 67/16 709/217 |
| 2015/0142968 A1* | 5/2015 | Bhagwat | H04L 67/16 709/224 |
| 2015/0281002 A1* | 10/2015 | Xu | H04L 67/12 709/223 |
| 2015/0296022 A1* | 10/2015 | Kim | H04L 67/12 709/203 |
| 2015/0365278 A1* | 12/2015 | Chakrabarti | H04L 41/0806 370/254 |
| 2015/0381737 A1* | 12/2015 | Quinn | H04L 67/12 709/217 |
| 2016/0072670 A1* | 3/2016 | Matthieu | H04L 67/12 709/204 |
| 2016/0091321 A1* | 3/2016 | Chintakindi | G01C 21/26 701/117 |
| 2016/0285979 A1* | 9/2016 | Wang | H04L 67/16 |
| 2016/0322044 A1* | 11/2016 | Jung | G06F 3/017 |
| 2017/0060568 A1* | 3/2017 | Seibert, Jr. | G06F 8/65 |
| 2017/0149937 A1* | 5/2017 | Ren | H04W 4/18 |
| 2017/0359417 A1* | 12/2017 | Chen | G06Q 30/01 |

* cited by examiner

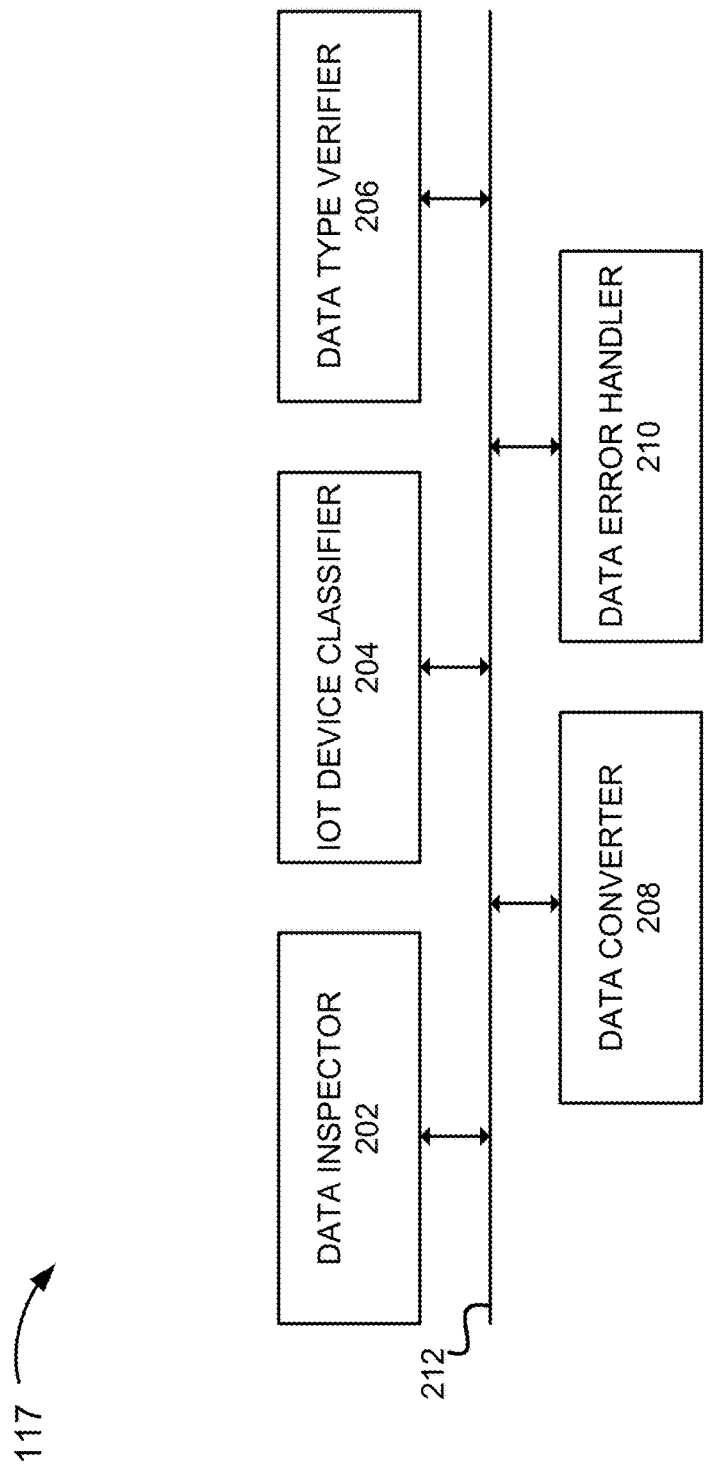

INTERNET OF THINGS COMMUNICATION UNIFICATION AND VERIFICATION

BACKGROUND

Internet of Things (IoT) technology refers to a wide range of devices that can collect data. The devices may be configured to transfer the data via a network. Since IoT technology has nearly limitless applications that can be leveraged to form new and useful services, interest among service providers and developers in IoT technology continues to increase.

BRIEF DESCRIPTION OF THE DRAWINGS

FIG. 2A is a diagram illustrating exemplary network elements of an IoT data unifier depicted in the environment of FIG. 1;

DETAILED DESCRIPTION OF PREFERRED EMBODIMENTS

Figure 1:
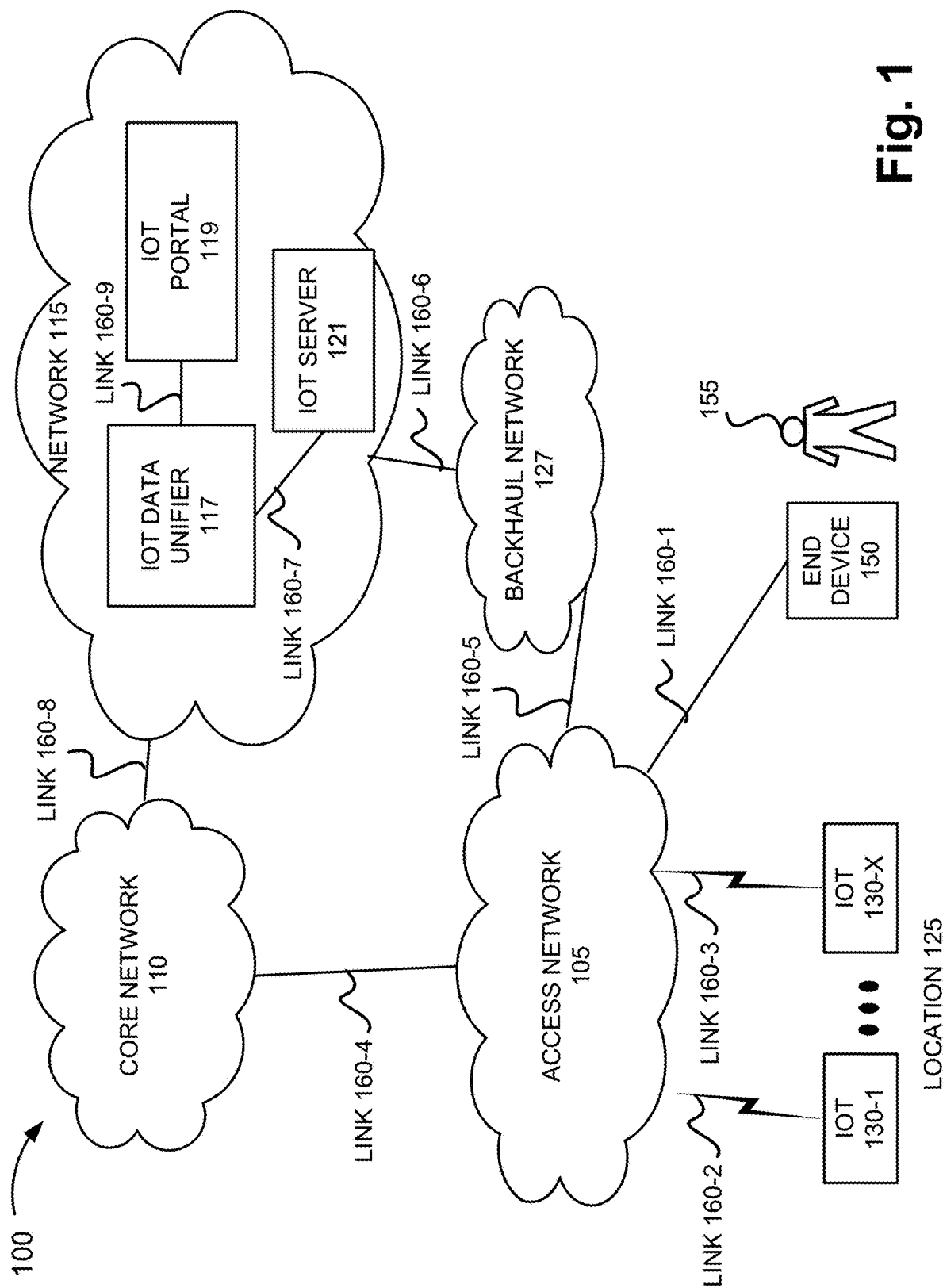
FIG. 1 is a diagram illustrating an exemplary environment in which an exemplary embodiment of an IoT unifier service and an IoT portal service of an IoT platform may be implemented.

The following detailed description refers to the accompanying drawings. The same reference numbers in different drawings may identify the same or similar elements. Also, the following detailed description does not limit the invention.

Various IoT manufacturers and IoT developers (referred to herein simply as IoT developer) of IoT devices are creating different types of IoT devices that offer different types of IoT data. This IoT data may be leveraged into new services to end users or other entities. Unfortunately, given the diversity of IoT developers and their respective IoT devices, there is an issue of non-uniformity of such devices with respect to compatibility with each other, platforms on which they may be deployed, etc. For example, IoT devices may vary in terms of communication protocols used, IoT data provided, format of the IoT data transmitted, and so forth. The issue of non-uniformity exists between IoT devices even of the same type. For example, a traffic sensor of one IoT developer may be configured to collect and transmit data that is different from another traffic sensor of another IoT developer. A traffic service provider or an application developer for end users may find it difficult to offer a service directed to this realm of technology in view of the non-uniformity that exists.

As an IoT developer, it is a challenge to ensure that a request that carries IoT data from an IoT device to a network device (e.g., cloud service, etc.) can be validated and accepted by the network device. For example, the IoT device transmits the request carrying IoT data that is unique in terms of content and data format. However, the IoT developer may not be assured that the IoT data and data format are compatible with the network device. From a network service provider perspective, the network service provider may wish to offer its service to multiple IoT developers. However, the network service provider is confronted with similar issues in trying to provide a wide net of compatibility.

According to an exemplary embodiment, an IoT platform provides an IoT unifier service directed to IoT communications. According to an exemplary embodiment, the IoT unifier service classifies or categorizes IoT devices. According to an exemplary implementation, the classifications of IoT devices are based on the types of IoT devices. For example, water meters that are made by different IoT developers are classified as a same type of IoT device. According to other exemplary implementations, the classifications of IoT devices are based on the type of IoT data provided by the IoT devices.

According to an exemplary embodiment, the IoT unifier service selects an IoT standard format for the IoT data based on the classification of the IoT device. The IoT unifier service determines whether an incoming packet carrying IoT data includes data types or data types and values (referred to herein as "standard data types") of the IoT standard format pertaining to a classification of the IoT device from which the incoming packet originated. According to an exemplary embodiment, the IoT standard format allows for customized data types provided that the standard data types are also present. When the IoT unifier service determines that the incoming packet includes the standard data types associated with the IoT device classification, the IoT unifier service converts the IoT data to the IoT standard format, as described herein. When the IoT unifier service determines that the incoming packet does not include the standard data types, the IoT unifier service may perform error handling procedures.

According to an exemplary embodiment, the IoT unifier service converts IoT data transmitted by IoT devices of the same classification into the IoT standard format in response to determining that packets include the standard data types. According to an exemplary embodiment, subsequent to converting the IoT data to the IoT standard format, the IoT unifier service forwards the converted IoT data to a particular destination (e.g., a cloud service, etc.).

According to an exemplary embodiment, the IoT platform provides an IoT portal service. The IoT portal service allows users to download and install a developer communication tool that provides users (e.g., IoT developers) access to and use of software development kits (SDKs) that provide IoT unifier testing services. Each of SDKs may be IoT device-specific based on the classification of the IoT device. Once downloaded and installed on an end device, the user can test IoT data that would be generated by the IoT device using the SDK. In this way, the user can determine whether their IoT device complies with the standard data types of the IoT unifier service. According to an exemplary embodiment, the SDK includes other functions, such as debugging functions and other utilities to guide the user when tested IoT data does not comply with the standard data types of an IoT standard format.

According to an exemplary embodiment, the IoT portal service includes a developer portal that provides an environment in which troubling shooting experiences and collaboration among IoT developers may be shared.

FIG. 1 is a diagram illustrating an exemplary environment 100 in which an exemplary embodiment of an IoT unifier service and an IoT portal service of an IoT platform may be implemented. As illustrated, environment 100 includes an access network 105, a core network 110, a network 115, and a backhaul network 127. Network 115 includes network elements. The network elements in network 115 include an IoT data unifier 117, an IoT portal 119, and an IoT server 121. Environment 100 also includes a location 125. Location 125 includes network elements. The network elements in location 125 include IoT devices 130-1 through 130-X (also referred to as collectively as IoT devices 130 and, individually and generically as IoT device 130). Environment 100 further includes an end device 150 and a user 155.

As further illustrated, environment 100 includes communicative links 160-1 through 160-9 (also referred to collectively as links 160 and, generically and individually as link 160) between the network elements, networks, and end device 150. A network element may transmit and receive data via link 160. Similarly, end device 150 may transmit and receive data via link 160. Environment 100 may be implemented to include wireless (e.g., radio, etc.) and/or wired (e.g., electrical, optical, etc.) links 160. A communicative connection between network elements and between end device 150 and a network element may be direct or indirect via link 160. For example, an indirect communicative connection may involve an intermediary network device or network element, and/or an intermediary network not illustrated in FIG. 1. Additionally, the number, the type (e.g., wired, wireless, etc.), and the arrangement of links 160 illustrated in environment 100 are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of end devices, the number of networks, and the arrangement in environment 100 are exemplary. According to other embodiments, environment 100 may include additional network elements, fewer network elements, and/or differently arranged network elements, than those illustrated in FIG. 1. Additionally, or alternatively, in some instances, there may be only a single IoT device 130 at location 125. Additionally, or alternatively, for example, there may be multiple end devices 150, IoT data unifiers 117, and so forth.

Additionally, or alternatively, according to other embodiments, multiple network elements may be implemented on a single device, and conversely, a network element may be implemented on multiple devices. Additionally, or alternatively, environment 100 may include an additional network and/or arrangement of networks that is/are different from that illustrated in FIG. 1. For example, access network 105 may be connected to another network (not illustrated). The other network may include other network elements (not illustrated). Additionally, or alternatively, one network may be combined with another network. For example, core network 110 and network 115 may be combined into a single network.

Access network 105 includes one or multiple networks of one or multiple types. For example, access network 105 may be implemented to include a terrestrial network, a satellite network, a wireless network, and/or a wired network. According to an exemplary implementation, access network 105 includes a radio access network (RAN). The RAN may be a 3rd Generation (3G) RAN, a 3.5G RAN, a Fourth Generation (4G) RAN, a 4.5G RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network, a U-TRAN, Universal Mobile Telecommunications System (UMTS) RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or the like. Depending on the implementation, access network 105 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. Access network 105 may include a wired network. For example, access network 105 may include an optical network or a cable network.

Core network 110 includes one or multiple networks of one or multiple types. For example, core network 110 may be implemented to include a terrestrial network, a satellite network, a wireless network, and/or a wired network. According to an exemplary implementation, core network 110 includes a complimentary network pertaining to the one or multiple RANs described above. For example, core network 110 may include the core part of an LTE network, an LTE-A network, etc. Depending on the implementation, core network 110 may include various network elements, such as a gateway, a support node, a serving node, a router, a switch, a bridge, as well other network elements pertaining to various network-related functions, such as billing, security, authentication and authorization, network polices, subscriber profiles, etc.

Network 115 includes one or multiple networks of one or multiple types. For example, network 115 may include the Internet, the World Wide Web, an Internet Protocol (IP) Multimedia Subsystem (IMS) network, a cloud network, a wide area network (WAN), a metropolitan area network (MAN), a service provider network, a private IP network, some other type of backend network, and so forth. As illustrated, according to an exemplary embodiment, network 115 includes IoT data unifier 117, IoT portal 119, and IoT server 121. According to other exemplary embodiments, IoT data unifier 117, IoT portal 119, and/or IoT server 121 may be implemented in core network 110.

IoT data unifier 117 includes a network device that provides the IoT unifier service. For example, IoT data unifier 117 may be implemented as a network computer. The IoT unifier service receives all packets that are transmitted by IoT devices 130. Upon receipt of the packets, the IoT unifier service inspects each packet, and identifies and verifies whether the IoT data carried in the packets includes data types of the IoT standard format pertaining to the classification of IoT device 130 from which the packets originated. For example, according to an exemplary embodiment, the IoT unifier service includes a verification service. The verification service, upon receipt of IoT data, compares data types included in the IoT data with the standard data types of the IoT standard format. The IoT unifier service may include multiple IoT standard formats that correspond to multiple classifications of IoT devices 130. For example, the IoT unifier service may enforce one IoT standard format pertaining to video cameras and another IoT standard format pertaining to gas meters.

According to an exemplary embodiment, the verification service also facilitates the management of customized data types and values. According to an exemplary implementation, the verification service will determine that a received packet carrying IoT data, which includes a data type and a value that is not one of the standard data types, is in compliance with the IoT standard format when the IoT data includes all of the standard data types of the IoT standard format. For example, assume that the standard data types are A, B, and C. Also assume that a received packet includes data types A, B, C, and D. According to an exemplary implementation, the verification service would determine that the received packet complies with the standard data types since the received packet includes all of the standard data types (i.e., A, B, and C). On the other hand, assume that the received packet includes data types A, B, and D. According to an exemplary implementation, the verification service would determine that the received packet fails to comply with the standard data types of the IoT standard format since the received packet does not include data type C. According to other exemplary implementations, the verification service may make different determinations and/or perform other operations in response to the received packet that includes data types A, B, and D. For example, depending on the standard data type that is missing, the verification service may insert or add the missing data type along with a default value or a dummy value.

When the verification service determines that the IoT data includes standard data types, the IoT unifier service converts the IoT data into the corresponding IoT standard format. According to an exemplary implementation, the IoT unifier service converts the IoT data into a JavaScript Object Notation (JSON) or an Extensible Markup Language (XML) format. In this regard, for example, the IoT unifier service may convert the IoT data from a low level language to a human readable language that is platform independent. According to other exemplary implementations, the IoT unifier service converts the IoT data into another well-known or conventional language format (e.g., plain text, HyperText Markup Language (HTML), binary data, etc.). When the IoT unifier service determines that the IoT data does not include the standard data types, the IoT unifier service rejects the received packets.

According to an exemplary embodiment, the IoT unifier service includes an error handling service. The error handling service is invoked when IoT data is determined not to comply with the standard data type of the IoT standard format pertaining to the classification of IoT device 130. The error handling service may include generation and transmission of notifications to an IoT service subscriber affiliated with IoT device 130, as well as performing other error handling measures, as described herein.

Figure 2B:
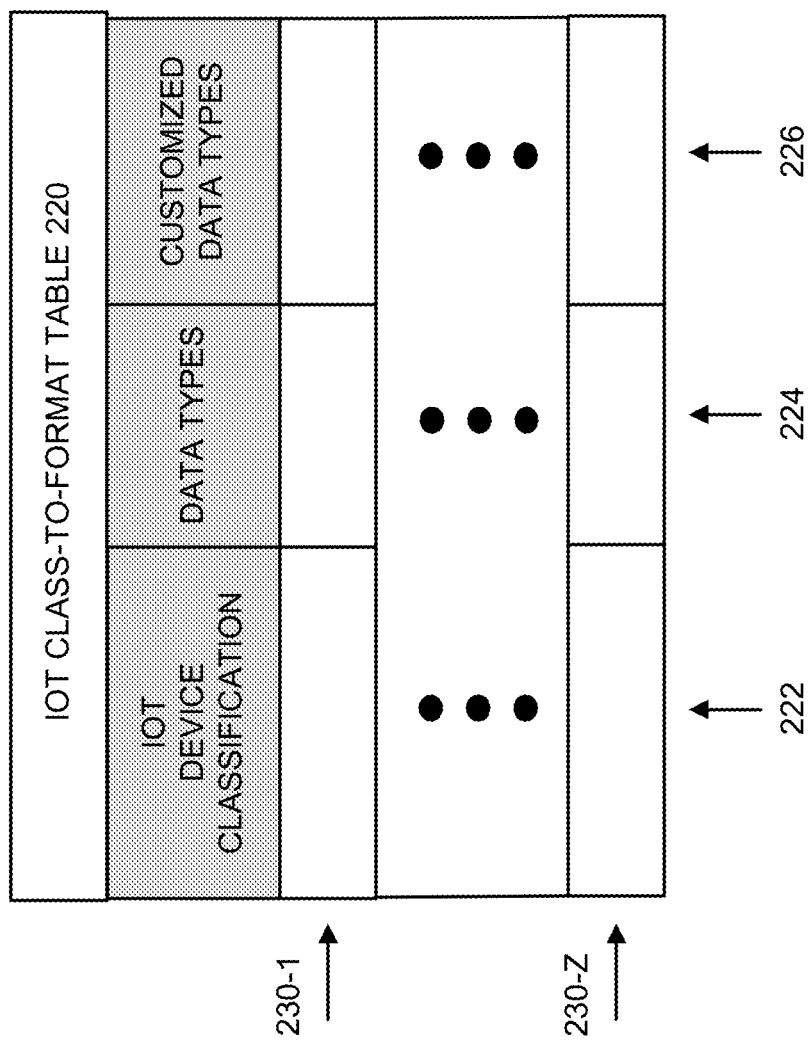
FIG. 2B is a diagram illustrating an exemplary table that stores exemplary IoT Class-To-Format profile information.

FIG. 2A is a diagram of exemplary network elements of IoT data unifier 117. As illustrated, IoT data unifier 117 includes a data inspector 202, an IoT device classifier 204, a data type verifier 206, a data converter 208, and a data error handler 210. According to other exemplary embodiments, IoT data unifier 117 may include additional, fewer, and/or different network elements than those illustrated in FIG. 2A and described herein. Additionally, or alternatively, multiple network elements of IoT data unifier 117 may be combined into a single network element and/or a single network element may be implemented as multiple network elements in which a process or a function may be collaboratively performed or multiple processes or functions may be split between them.

Data inspector 202, IoT device classifier 204, data type verifier 206, data converter 208, and/or data error handler 210 may be connected to and communicate with each other via a link 212. For example, link 212 may be implemented as a hardware link (e.g., a data bus, a system bus, a control bus), a software link (e.g., an application program interface (API), inter-process communication (IPC), etc.) or an inter-network device link (e.g., link 160).

According to an exemplary embodiment, data inspector 202 includes logic that identifies packets carrying IoT data. According to an exemplary implementation, data inspector 202 uses a packet inspection method. For example, data inspector 202 may perform deep packet inspection. As a result of the packet inspection, depending on the implementation, data inspector 202 may obtain various types of IoT data. For example, data inspector 202 may obtain payload data and, other types of data, such as network protocol data (e.g., source Internet Protocol (IP) address, destination IP address), a device identifier of IoT device 130, and so forth, carried by a packet. According to another exemplary implementation, data inspector 202 uses a packet filtering method. As a result of the packet filtering, data inspector 202 obtains the payload data, or the payload data along with other types of data (e.g., network protocol data; other data (e.g., a device identifier of IoT device 130, etc.)), carried by the packet.

According to an exemplary embodiment, IoT device classifier 204 includes logic to select a classification of the IoT device to which the IoT data pertains. According to an exemplary implementation, the IoT data may include data that indicates the classification. For example, the payload data may include a classification data type field and a value (e.g. Classification: Video camera). According to another exemplary implementation, the IoT data may include attribute data pertaining to the IoT device, which can be mapped to a classification of the IoT device. For example, the IoT data may include a make data type field and a value, and a model type data field and a value (e.g., Make: Company ABC; Model: 324-A). According to yet other exemplary implementations, other types of data may be used as a key to determine the classification of IoT device 130, such as an Internet Protocol (IP) address of IoT device 130, an IoT device identifier of IoT device 130 (e.g., an equipment identifier, a device name, etc.), and so forth.

According to an exemplary embodiment, when the classification is not included in the IoT data, IoT device classifier 204 includes logic to extract particular data (e.g., a particular standard data type) from the IoT data and use the extracted data to perform a lookup (e.g., in a database or a data structure) in order to determine the IoT device classification. For example, the database or the data structure may provide a correlation or a mapping between a standard data type and an IoT device classification. The database or the data structure may be implemented based on information obtained from subscribers of the IoT unifier service and the IoT portal service. For example, user 155 may register with the IoT platform and services via IoT portal 119. During a registration process, user 155 may provide, for example, information pertaining to IoT device 130 and/or IoT data to be transmitted by the IoT device 130 that can be used by the IoT unifier service to determine the classification of the IoT device 130. For example, values of standard data types (e.g., make and model of IoT device 130) may form a basis to map particular IoT data (e.g., standard data type and value) to a classification. Additionally, or alternatively, for example, IoT devices 130 of a particular classification may be assigned IP addresses from a pool of IP addresses designated for a particular classification.

Undoubtedly, there are numerous types of IoT devices 130 available today and an exhaustive treatment of the various types of IoT devices 130 is beyond the scope of this disclosure. Nevertheless, examples of IoT devices 130 include a meter (e.g. a utility meter, a parking meter, etc.), a sensor (e.g., a weather sensor, a traffic sensor, a home appliance sensor, etc.), a video camera (e.g., a security video camera, a video camera to capture social information at an establishment (e.g., number of persons in a bar, restaurant, etc.) etc.), a LoJack® device, a hum device, a tag (e.g., to collect location data pertaining to public transportation vehicles (e.g., busses, subways, trains, public service vehicle, etc.), a dongle, a smartphone (e.g., to collect location data pertaining to a mobile device and/or its user), a medical device, a civilian unmanned aerial vehicle (UAV)/drone flight control unit, etc. The IoT device classifications may be implemented very generally, such as, for example, meters, or more specifically as water meter, gas meter, a parking meter, and so forth. As described herein, the IoT unifier service converts IoT data transmitted by IoT devices 130 of the same classification into an IoT standard format assigned for that classification.

According to another exemplary embodiment, a classification of the IoT device affords other services. For example, depending on the classification of the IoT device, IoT data unifier 117 may provide varying levels of security, urgency (e.g., transmission delay, resource utilization (e.g., processing power, etc.)), and/or reliability (e.g., package loss, duplication control, etc.), with respect to the packet. For example, a classification of a water meter may be afforded a lower level of security, urgency, and/or reliability than a classification of a traffic sensor. According to an exemplary implementation, a network element of IoT data unifier 117 may add one or multiple data fields and one or multiple values pertaining to a level of security, urgency, and/or reliability, with respect to the packet, based on the classification of the IoT device and/or network rules. For example, IoT device classifier 204, date type verifier 206, or data converter 208 may add the one or multiple data fields and the one or multiple values.

According to an exemplary embodiment, data type verifier 206 includes logic to verify that the IoT data includes the data types that have been assigned to the IoT device classification. For example, data type verifier 206 may receive from IoT device classifier 204 the IoT device classification pertaining to a packet carrying IoT data. Upon receipt of the IoT device classification, data type verifier 206 includes logic to search, perform a lookup, and/or query, a database or a data structure to determine whether the data type included in the packet correspond to the data type of the IoT standard format pertaining to the classification. Suffice to say, the IoT standard format may include one or multiple standard data types. By way of further example, referring to FIG. 2B, data type verifier 206 may query an exemplary IoT Class-to-Format table 220. As illustrated, table 220 includes an IoT device classification field 222, a data types field 224, and a customized data types field 226. According to other implementations, IoT Class-to-Format table 220 may include additional instances of data, fewer instances of data, and/or different types of data. For example, according to other exemplary implementations, table 220 may not include customized data types field 226. Table 220 include profiles 230-1 through 230-Z (also referred to as profiles 230 and, individually and generically as profile 230). Each 230 pertains to different classifications of IoT devices 130.

According to one exemplary implementation, data type verifier 206 may be a general model provided by the IoT platform. According to another exemplary implementation, data type verifier 206 may be IoT developer-specific and is provided by the IoT developer of IoT device 130. For example, the IoT developer may provide (e.g., upload, install, deploy, etc.) the IoT-developer-specific data type verifier 206 to IoT data unifier 117. IoT portal 119 may provide a utility to perform such a task. According to such an exemplary implementation, IoT data unifier 117 may afford a greater flexibility to tackle the tremendous number of different IoT devices 130 and corresponding IoT data to which the IoT platform is exposed.

IoT device classification field 222 stores data that indicates a classification of an IoT device. For example, IoT device classification field 222 may store various classifications, such as water meter, parking meter, environmental sensor, traffic sensor, and so forth, or identifications (e.g. numbers) associated therewith.

Data types field 224 stores data that indicates the standard data types of an IoT standard format pertaining to the IoT device classification stored in IoT device classification field 222. For example, with respect to an IoT device classification, such as a gas meter, data types field 224 may store data types, such as make, model, gas usage, date, timestamp, and so forth. According to an exemplary implementation, the standard data types may include a particular ordering of the data types. For example, the standard data types may not only require that a packet includes the data types of A, B, and C, but also that the payload of the packet includes the data types and the particular ordering. Thus, when the packet carries data types B, C, and A, in that order, the packet may not comply with the standard data type requirement. According to other exemplary implementations, the standard data types may not impose an ordering requirement.

Customized data type field 226 stores data that indicates customized data fields that are permissible to add to the standard data types, but are not necessary. For example, customized data type field 226 may store various data types, such as a unit of measurement, a geo-location, and so forth.

Returning to FIG. 2A, in an exemplary process, data type verifier 206 compares the classification obtained from IoT device classifier 204 with IoT device classification 222. In response to finding a match with respect to a particular profile 230, data type verifier 206 compares the data types stored in data types field 224 of the selected profile 230 with the data types included in the packet. Depending on the result of the query, data type verifier 206 includes logic to determine whether the data types included in the packet comply with the standard data types stored in data types field 224. According to an exemplary implementation, data type verifier 206 may also compare a data type included in the packet, which does not match one of the standard data types stored in data types field 224, to a data type stored in customized data types field 226. According to other exemplary implementations, data type verifier 206 may not perform such a comparison.

Data type verifier 206 determines that the data types included in the packet comply with the standard data type requirement when the IoT data matches all of the standard data types (and perhaps order) stored in data types field 224. For example, when the IoT data includes data types A, B, C, and D, and the IoT data includes the data types A, B, C, and D, then the IoT data satisfies the standard data type requirement. In response to such a determination, data type verifier 206 passes the IoT data of the packet to data converter 208. However, when data type verifier 206 determines that the standard data type requirement is not satisfied, data type verifier 206 passes the IoT data to data error handler 210. For example, when the standard data types include data types A, B, C, and D, and the IoT data only includes data types A, B, and C, then the IoT data does not satisfy the standard data type requirement.

Referring to FIG. 2A, data converter 208 includes logic to convert IoT data to an IoT standard format. According to an exemplary implementation, data converter 208 converts the IoT data into a JSON, XML, or other well-known format. By way of example, assume the IoT data in the packet is the following:

Model: Pioneer-60, Type: Water Meter, Usage 2500, Time: 1510456713, in which the model of the IoT device 130 is "Pioneer-60", the classification of the IoT device 130 is "Water Meter", the measured usage of water is "2500", and the time of measurement is "1510456713" (which is a UTC time in seconds since UNIX epoch (Jan. 1, 1970)). Based on this input data, data converter 208 converts the IoT data in the following exemplary way:

```
{
"Model": Pioneer-60,
"Type": Water Meter,
"Usage": 2500,
"Time": 1510456713
}
```

According to another example, assume that the IoT data in the packet is the following:

Model: Pioneer-60, Type: Water Meter, Usage 2500, Time: 1510456713, cfs: 5 in which the model of the IoT device 130 is "Pioneer-60", the classification of the IoT device 130 is "Water Meter", the measured usage of water is "2500", and the time of measurement is "1510456713." Additionally, the IoT data includes customized data. For example, cubic feet per second (cfs) is a customized data type that has a value of "5" (e.g., water rate of flow per second is 5 cubic feet).

Based on this input data, data converter 208 converts the IoT data in the following exemplary way:

```
{
"Model": Pioneer-60,
"Type": Water Meter,
"Usage": 2500,
"Time": 1510456713,
"cfs": 5
}
```

According to one exemplary implementation, data converter 208 may be a general model provided by the IoT platform. According to another exemplary implementation, data converter 208 may be IoT developer-specific and is provided by the IoT developer of IoT device 130. For example, the IoT developer may provide (e.g., upload, install, deploy, etc.) the IoT-developer-specific data converter 208 to IoT data unifier 117. IoT portal 119 may provide a utility to perform such a task. According to such an exemplary implementation, IoT data unifier 117 may afford a greater flexibility to tackle the tremendous number of different IoT devices 130 and corresponding IoT data to which the IoT platform is exposed.

Subsequent to the conversion of the IoT data to the IoT standard format, data converter 208 transmits the IoT data to a destination network device. For example, data converter 208 generates and transmits a packet including the IoT data to IoT server 121.

Data error handler 210 includes logic to manage errors that occur while providing the IoT unifier service. For example, data error handler 210 may receive an error message from data inspector 202 when bit errors in a request cannot be resolved. Data error handler 210 may perform forward error correction, etc., to resolve any errors. When successful, data error handler 210 may return the corrected IoT data to data inspector 202. Depending on the capabilities of IoT device 130, according to an exemplary implementation, when error correction is unsuccessful, data error handler 210 transmits a request for retransmission according to a conventional retransmission scheme (e.g., automatic repeat request (ARQ), etc.). For example, data error handler 210 may store or obtain (e.g., from another network device) an IoT device profile that indicates the capabilities of IoT device 130. Data error handler 210 may perform a lookup to determine whether IoT device 130 has retransmission capabilities. When it is determined that IoT device 130 has retransmission capabilities, data error handler 210 may initiate a retransmission process.

Additionally, for example, data error handler 210 may receive an error message from IoT device classifier 204. For example, when the classification of IoT device 130 cannot be resolved, data error handler 210 may receive the error message from IoT device classifier 204. According to an exemplary implementation, data error handler 210 may store or obtain an IoT subscriber profile that indicates error management information (e.g., communication address of point-of-contact person, such as telephone number, e-mail address, etc., a device, etc.). Data error handler 210 may perform a lookup that is directed to the IoT subscriber profile. Based on a result of the lookup, data error handler 210 generates and transmits an error notification to the designated person and/or device. The error notification would include an indication of the type of error (e.g., IoT device class unrecognized). The error notification may include the IoT data carried in the packet that resulted in the error. Additionally, or alternatively, data error handler 210 may perform a resolution process, as described further below.

Additionally, for example, data error handler 210 may receive an error message from data type verifier 206. For example, when the data types do not match the standard data types, data error handler 210 may receive the error message from data type verifier 206. In some cases, the mismatch of data types may be caused by a new version of IoT device 130 that transmits IoT data having a different IoT data format compared to a legacy IoT device 130, but data type verifier 206 is unable to correctly interpret the new IoT data format. According to an exemplary implementation, data error handler 210 may perform a lookup directed to the IoT device profile. The IoT device profile may include a metadata file or an IoT data format template pertaining to the IoT data transmitted. Data error handler 210 may provide this information to data type verifier 206 in attempt to resolve the error before generating and transmitting an error notification. When the resolution process is unsuccessful, data error handler 210 generates and transmits an error notification to the designated person and/or device. The error notification would include an indication of the type of error (e.g., not all of the standard data types are present). Additionally, the error notification may include the IoT data carried in the packet that resulted in the error.

Referring to FIG. 1, IoT portal 119 includes a network device that provides the IoT portal service. For example, IoT portal 119 may be implemented as a network computer. The IoT portal service allows users to download and install a developer communication tool that provides users access to and use of SDKs that provide IoT unifier testing services. For example, a user (e.g., user 155) may download and install the developer communication tool on an end user device (e.g., end device 150). When executed, user 155 may communicate with IoT portal 119 and select an SDK of choice. For example, the SDKs available may correspond to different IoT device classifications (e.g., an SDK for video cameras, an SDK for hum devices, etc.). User 155 may install the SDK on end device 150. Once installed, user 155 can locally develop, test, and/or troubleshoot IoT data that would be generated or has been generated by IoT device 130 (e.g., under development, deployed in the field, etc.) using the SDK. For example, user 155 may import IoT data using the SDK. Alternatively, user 155 may be able to code IoT data using the SDK. In this way, user 155 can determine whether their IoT device 130 complies with the standard data types of the IoT unifier service (pre-deployment) or troubleshoot an error that may have occurred post-deployment. For example, user 155 can simulate a request to the unifier service, locally at end device 150, without creating traffic in the network, initiating a live troubleshooting session with the network service provider, and so forth.

The SDK includes other functions, such as debugging functions to guide user 155 when tested IoT data does not comply with the standard data types. The SDK may also include a utility (e.g., file manager, a data editor, etc.), sample code, supporting documentation, and so forth. In this way, user 155 may develop, test, and/or troubleshoot in an integrated development environment (IDE). The SDK may also provide a utility that allows the user to upload, deploy, etc., for example, data type verifier 206 and/or data converter 208, which is IoT-developer specific, as previously described.

According to an exemplary embodiment, the IoT portal service includes a developer portal that provides an environment in which troubling shooting experiences and collaboration among IoT developers may be shared.

Figure 2C:
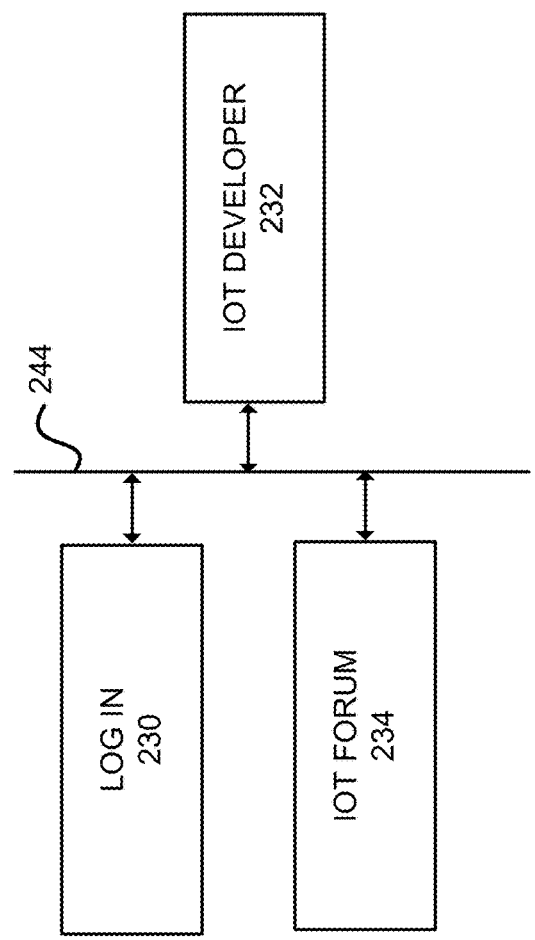
FIG. 2C is a diagram illustrating exemplary network elements of an IoT portal depicted in the environment of FIG. 1.

FIG. 2C is a diagram illustrating exemplary network elements of IoT portal 119. For example, as illustrated, IoT portal 119 includes a log in 230, an IoT developer 232, and an IoT forum 234. According to other exemplary embodiments, IoT portal 119 may include additional, fewer, and/or different network elements than those illustrated in FIG. 2C and described herein. Additionally, or alternatively, multiple network elements of IoT portal 119 may be combined into a single network element and/or a single network element may be implemented as multiple network elements in which a process or a function may be collaboratively performed or multiple processes or functions may be split between them.

Each of log in 230, IoT developer 232, and IoT forum 234 provides a graphical user interface that allows a user (e.g., user 155) to use the various services and perform various tasks as described herein.

Log in 230, IoT developer 232, and/or IoT forum 234 may be connected to and communicate with each other via a link 244. For example, link 244 may be implemented as a hardware link (e.g., a data bus, a system bus, a control bus), a software link (e.g., an application program interface (API), inter-process communication (IPC), etc.) or an inter-network device link (e.g., link 160).

According to an exemplary embodiment, log in 230 includes logic that provides a log in service. For example, log in 230 performs authentication and authorization. As an example, user 155 may enter a user name and a password, which is subsequently validated or not. Log in 230 may include an on-boarding process (e.g., registration, etc.) for a new user that includes configuration and assignment of user credentials. Log in 230 stores these user credentials and uses the user credentials for comparison when user 155 logs in. Log in 230 may also provide other well-known communication services pertaining to security, such as encryption, secure connection, and so forth. According to an exemplary embodiment, log in 230 also includes logic that manages and stores a subscriber profile. The subscriber profile may store data pertaining to various services offered via IoT portal 119.

According to an exemplary embodiment, IoT developer 232 includes logic that provides an IoT development service. For example, the IoT development service provides user 155 access to a catalog of SDKs to use. These SDKs may be used by user 155 to develop a software application (e.g., a client on IoT device 130) and/or troubleshoot an existing IoT device 130 already deployed. As previously described, the SDK include a set of tools including, for example, a debugger, software libraries, documentation, sample code, tutorials, and so forth. The SDK may provide these tools in an IDE. User 155 may install the SDK on end device 150. Once installed, user 155 can locally develop, test, and/or troubleshoot IoT data that would be generated or has been generated by IoT device 130 (e.g., under development, deployed in the field, etc.) using the SDK.

According to an exemplary embodiment, the SDK may include an error monitoring service. For example, for an IoT device 130 that is already deployed, the SDK may provide an error monitoring service. In the event that data error handler 210 transmits an error notification to end device 150, upon receipt of the error notification, the SDK may alert user 155 of the error. For example, the error monitoring service may operate as a daemon service. When the error notification is received, the error monitoring service may cause a cue (e.g., visual, auditory, tactile) to be generated on end device 150 so as to alert user 155 of the error. Depending on the circumstances, a delay in correcting IoT data transmitted by numerous IoT devices 130 could be critical to an IoT service, end user applications used by users, etc. The alert may indicate the type of error (e.g., data type, IoT classification, etc.). As an example, a situation as described may occur when user 155 upgrades an IoT device 130 without testing the upgraded IoT device 130 with the SDK, or when an upgrade to the IoT unifier service occurs in which the IoT standard format may change. According to an exemplary implementation, in response to the error notification, the SDK may connect to IoT portal to make sure that the most up-to-date SDK for a particular IoT classification is installed on end device 150. The SDK may also provide a utility that allows the user to upload, deploy, etc., for example, data type verifier 206 and/or data converter 208, which is IoT-developer specific, as previously described.

According to an exemplary embodiment, IoT forum 234 includes logic that provides an IoT forum service that provides an environment in which troubleshooting experiences and collaboration among users (e.g., IoT developers) may be shared. For example, IoT forum 234 may include various interactive platforms, such as chat rooms, message boards, and so forth, that allows the users to communicate with each other. The users may upload files for discussion, questions, feedback, etc. The IoT portal service may also include a feedback portal that allows users to post messages directed to the network service provider in relation to any of the IoT services (e.g., the unifier service, etc.). The network service provider may post messages in response to messages from the users.

Referring back to FIG. 1, IoT server 121 includes a network device that uses IoT data to perform a process or a function, to provide a service, or the like. For example, IoT server 121 may provide end user information based on the IoT data received from IoT devices 130. By way of further example, end users may connect to IoT server 121 via an end user device to receive traffic information, weather information, a location-based service, or some other IoT-based service.

Backhaul network 127 includes one or multiple networks of one or multiple types. According to an exemplary implementation, backhaul network 127 includes a backbone network. For example, the backbone network may be implemented as an optical transport network or other suitable architecture. According to an exemplary implementation, backhaul network 127 provides a connection path to the IoT platform of network 115. For example, IoT device 130 may transmit IoT data to IoT data unifier 117 via access network 105 and backhaul network 127. According to an exemplary implementation, when access network 105 is implemented as an LTE RAN or an LTE-A RAN, backhaul network 127 may directly connect to an evolved Node B. According to such architecture, the IoT data transmitted may not traverse network elements of a complimentary part of core network 110.

Location 125 is a geographic locale. Location 125 may be an indoor location, an outdoor location, a public location, a private location, a place of business, and so forth. For example, location 125 may be a retail location (e.g., a shopping mall, a retail store, a grocery store, etc.), a transportation location (e.g., a train station, an airport, a bus station, etc.), an entertainment location (e.g., a movie theater, a museum, a park, a restaurant, a sports stadium, etc.), a business location (e.g., a bank, a hotel, etc.), a parking garage, a hospital, a traffic intersection, a residence, and so forth. IoT device 130 may be installed or situated at location 125.

IoT device 130 includes logic to collect, obtain, and/or generate IoT data. For example, IoT device 130 may be implemented to include various technologies, such as a sensor, a tag, a camera, an antenna, etc, that collects, obtains, and/or generates IoT data. According to various implementations, IoT device 130 may be a stationary device or a mobile device. IoT device 130 may include a component (e.g., a Global Positioning System (GPS) chipset, etc.) that provides location-aware functionality. IoT device 130 may be powered by an internal source, an external source, a battery, an outlet, electromagnetic waves, and so forth.

IoT device 130 communicates to access network 105, network 115 and, core network 110 and/or backhaul network 127 via a communication interface. IoT device 130 may also communicate with local devices (not illustrated) at location 125 using various short-range communication technologies. For example, IoT device 130 may obtain IoT data from a sensor or a door lock.

End device 150 includes a communicative and computational device. End device 150 may be implemented as a mobile device, a portable device, or a stationary device. For example, end device 150 may be implemented as a smartphone, a tablet, a phablet, a netbook, a computer (e.g., a laptop, a desktop, a palmtop, etc.), a personal digital assistant, a terminal, and so forth. According to an exemplary embodiment, end device 150 provides user 155 access to IoT portal 119. For example, end device 150 includes a client, such as a web browser or other suitable software application. User 155 is an operator of end device 150. For example, user 155 may be a network administrator, a third party (e.g., a vendor, a merchant), and so forth. User 155 may use the IoT services provided by the IoT platform, as described herein.

Figure 3:
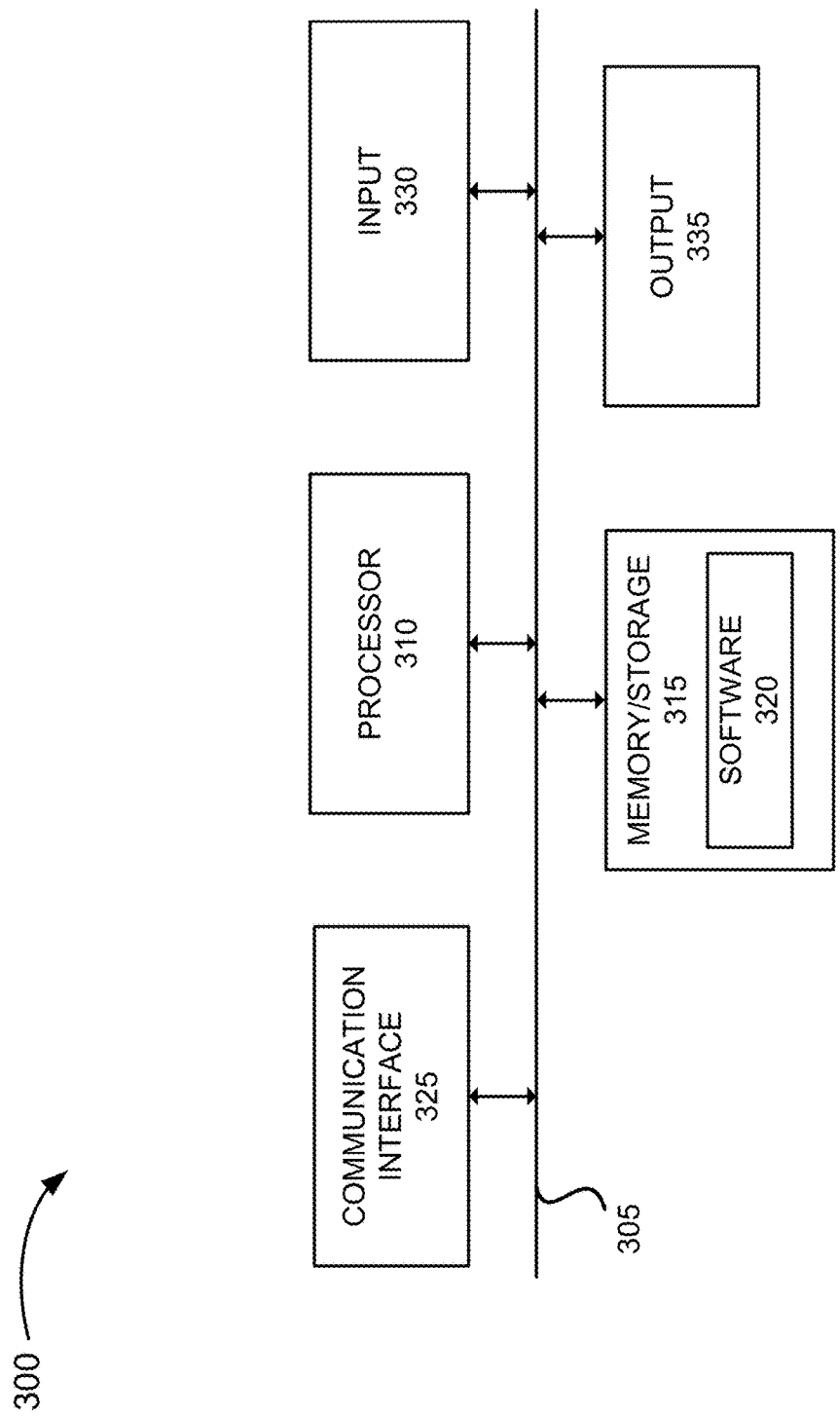
FIG. 3 is a diagram illustrating exemplary components of a device that may correspond to the network elements and an end device depicted in the environment of FIG. 1.

FIG. 3 is a diagram illustrating exemplary components of a device 300. Device 300 may correspond to each of the network elements and end device depicted in environment 100. As illustrated in FIG. 3, according to an exemplary embodiment, device 300 includes a bus 305, processor 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray® disk (BD), etc.). Memory/storage 315 may store data, software, and/or instructions related to the operation of device 300.

Software 320 includes an application or a program that provides a function and/or a process. Software 320 is also intended to include firmware, middleware, microcode, hardware description language (HDL), and/or other form of instruction. By way of example, with respect to the network elements that include logic to provide the IoT unifier service and the IoT portal service, these network elements may be implemented to include software 320. Additionally, for example, end device 150 may include software 320 (e.g., an application to communicate to IoT portal 119, etc.) to perform tasks as described herein.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include an antenna. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4A:
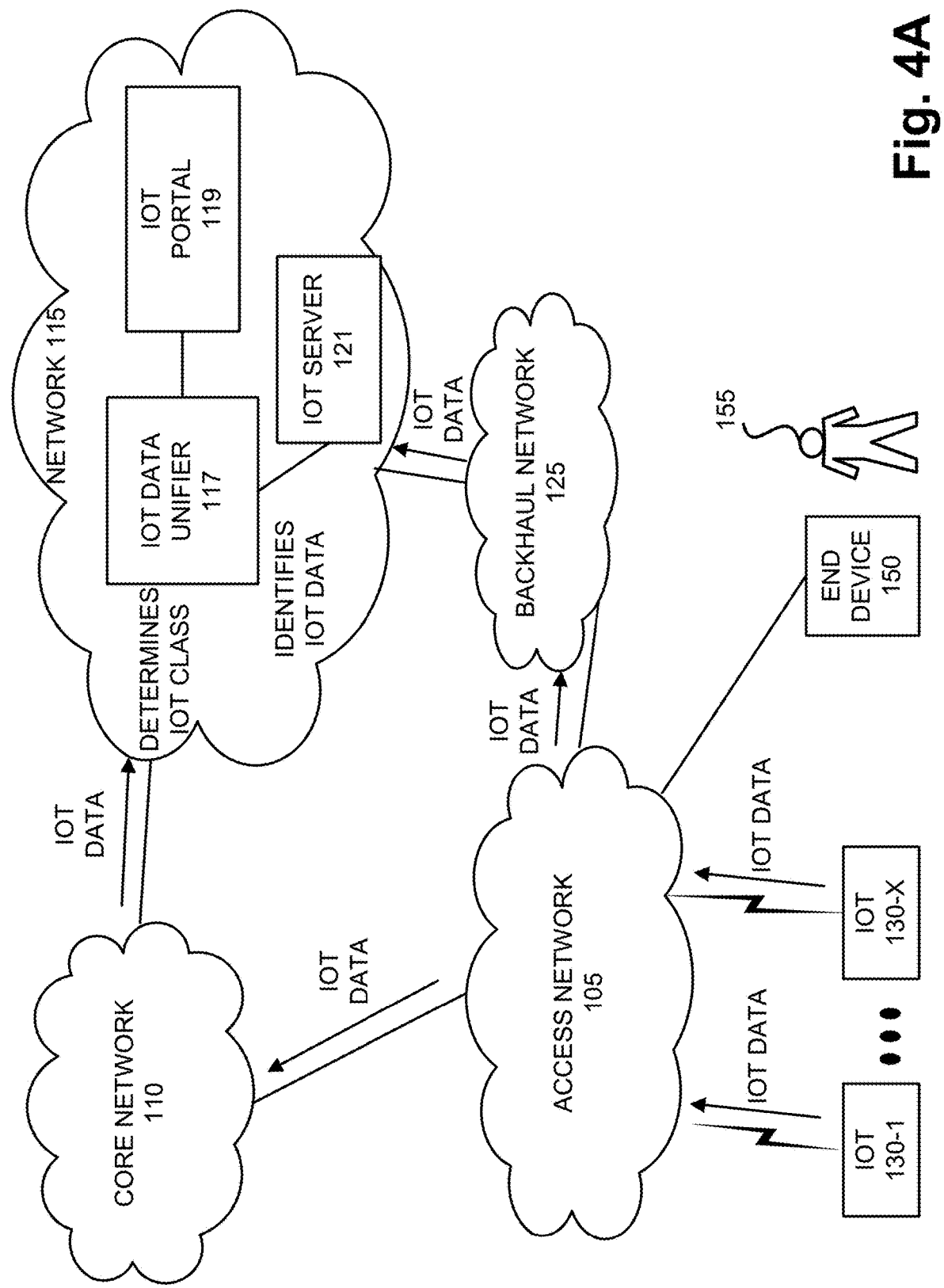
FIGS. 4A-4D are diagrams that illustrate exemplary processes pertaining to an exemplary embodiment of the IoT platform in view of an exemplary scenario.
Figure 4B:
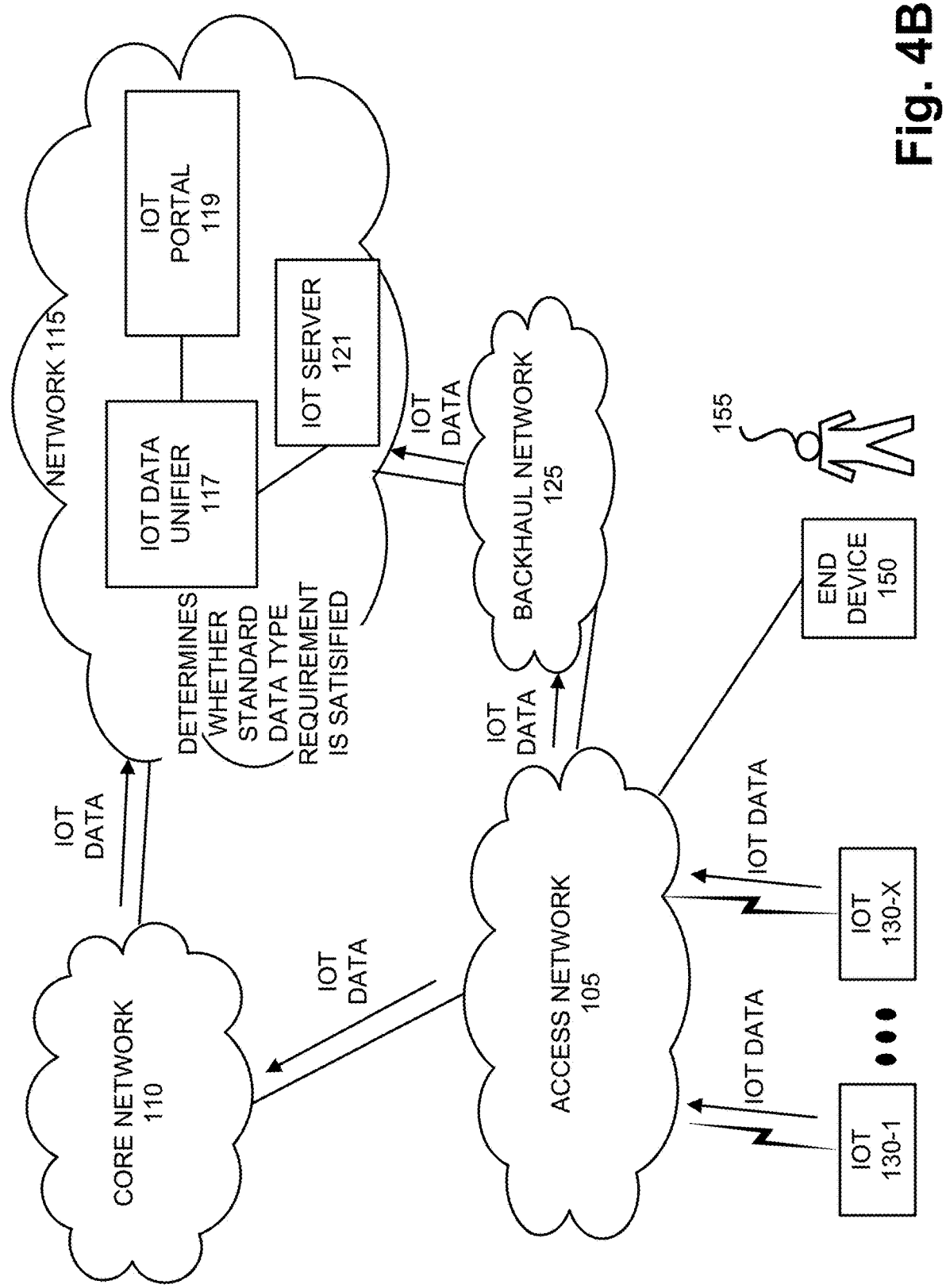
Figure 4C:
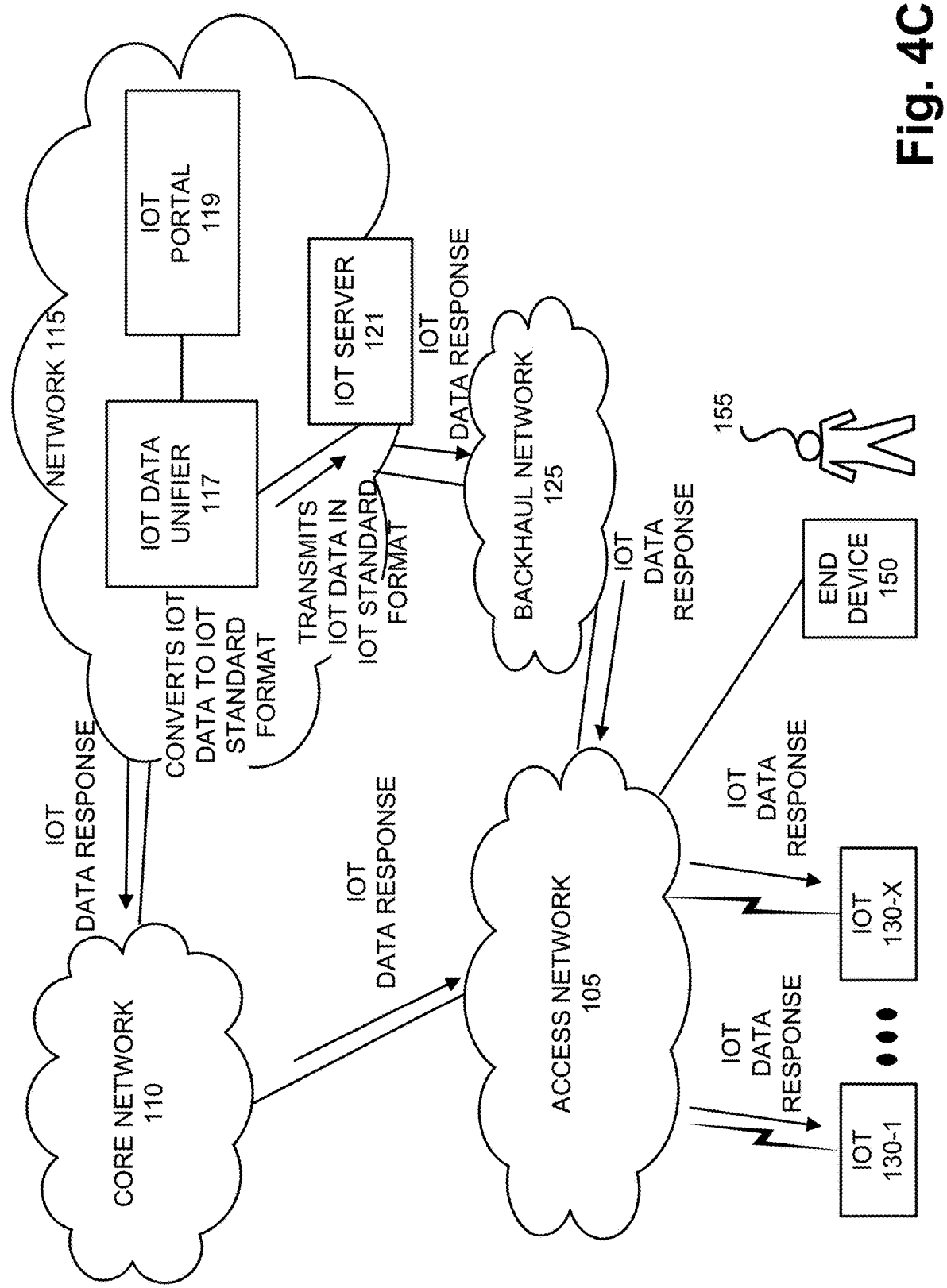

FIGS. 4A-4D are diagrams that illustrate exemplary processes pertaining to the IoT platform. Referring to FIG. 4A, for example, IoT devices 130 begin transmitting IoT data to IoT data unifier 117. According to various implementations, the packets may traverse core network 110 or may traverse backhaul network 127, as illustrated. The packets that carry the IoT data are received at IoT data unifier 117. In response, the IoT unifier service is provided. For example, data inspector 202 identifies the IoT data included in the packets. IoT device classifier 204 determines an IoT device classification of each of the packets. Referring to FIG. 4B, data type verifier 206 determines whether the IoT data satisfies the standard data type requirements corresponding to the IoT device classification. Referring to FIG. 4C, when the IoT data satisfies the standard data type requirements, data converter 208 converts the IoT data into the IoT standard format. Thereafter, data converter 208 generates and transmits the IoT data, which is in the IoT standard format, to IoT server 121. IoT server 121 processes the IoT data and may send an IoT data response back to IoT device 130 via core network 110 or backhaul network 127. As an example, IoT server 121 may be a web server that provides real-time traffic information to end users based on IoT data received from IoT devices 130.

Figure 4D:
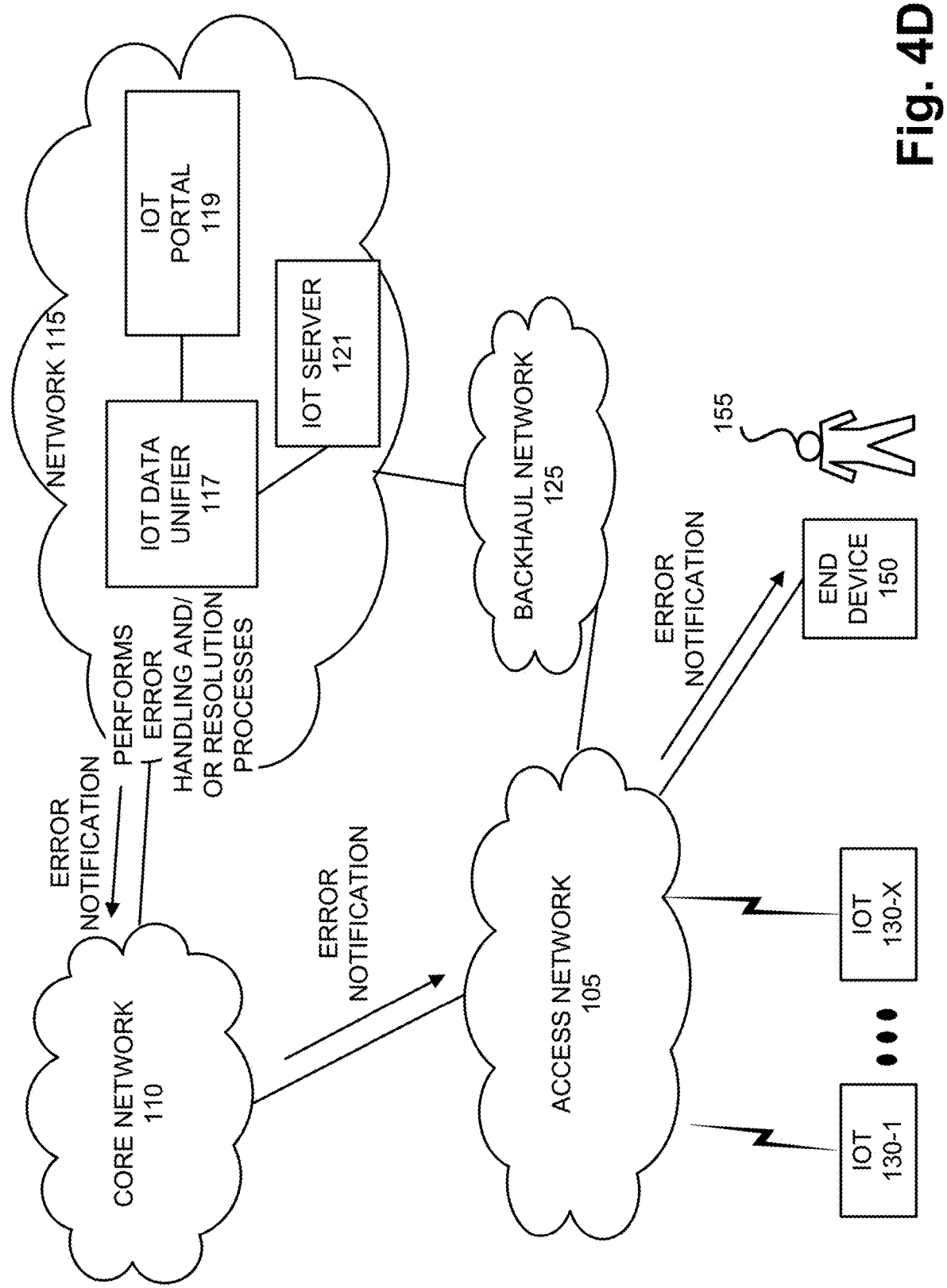

Referring to FIG. 4D, does not satisfy the standard data type requirements, data error handler 210 performs an error handling procedure, as previously described, such as a resolution process or an error notification process. For example, data error handler 210 may generate and transmit an error notification to end device 150. The error notification indicates the type of error (e.g., IoT device class error, data type error, etc.) and the IoT data carried in the packet that resulted in the error.

Although FIGS. 4A-4D illustrate exemplary processes pertaining to the IoT application framework, according to other embodiments and/or scenarios, a process may include additional operations, fewer operations, and/or different operations than those illustrated and described.

Figure 5:
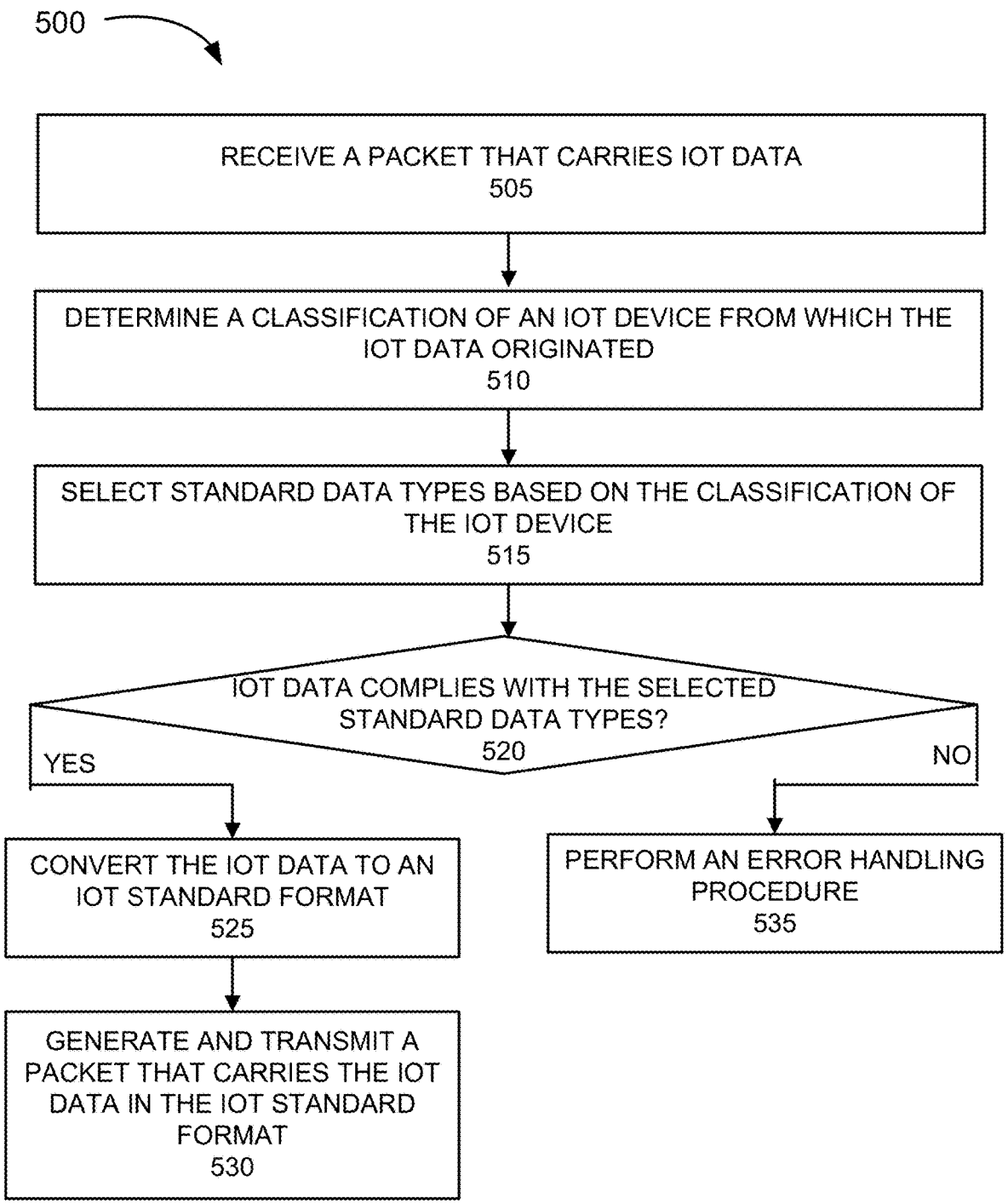
FIG. 5 is a flow diagram illustrating an exemplary process pertaining to an exemplary embodiment of the IoT unifier service.

FIG. 5 is a flow diagram illustrating an exemplary process 500 pertaining to the IoT unifier service of the IoT platform. Process 500 is directed to processes previously described with respect to FIGS. 2A, 2B, 4A-4D, and elsewhere in this detailed description, in which the IoT unifier service of the IoT platform is described. According to an exemplary embodiment, IoT data unifier 117 performs the steps of process 500. For example, processor 310 executes software 320 to perform the steps described.

Referring to FIG. 5, in block 505, a packet that carries IoT data is received. For example, data inspector 202 receives the packet from IoT device 130. Data inspector 202 inspects the IoT data carried in the packet. For example, data inspector 202 may include deep packet inspection logic or packet filtering logic to read, interpret, and/or extract data carried in the packet. Data inspector 202 may perform this logic with respect to any part of the packet (e.g., payload, header, trailer, etc.).

In block 510, a classification of the IoT device from which the IoT data originated is determined. For example, IoT device classifier 204 determines the IoT device classification based on the IoT data inspected. For example, the IoT data may include a data type that indicates the classification of IoT device 130. Alternatively, the IoT data may include a data type and a value that can be mapped to a classification of IoT device 130 based on a lookup. Additionally, or alternatively, IoT device classifier 204 uses network protocol data (e.g., IP address, etc.) as a basis to determine the classification of IoT device 130.

In block 515, standard data types are selected based on the classification of the IoT device. For example, data type verifier 206 selects the standard data types that correlate with the selected classification of IoT device 130. For example, when the selected classification of IoT device 130 is a parking meter, data type verifier 206 selects the standard data types of an IoT standard format that have been assigned to this class of IoT device by the IoT unifier service.

In block 520, it is determined whether the IoT data complies with the selected standard data types. For example, data type verifier 206 compares the standard data types to the data types included in the IoT data. Based on a result of the comparison, data type verifier 206 determines whether the IoT data includes all of the standard data types of the IoT standard format. When it is determined that the IoT data complies with the standard data types (block 520—YES), the IoT data is converted into the IoT standard format (block 525). For example, data converter 208 receives the IoT data from data type verifier 206. Data converter 208 converts the IoT data into the IoT standard format. According to an exemplary implementation, the IoT standard format is based on a JSON format or an XML format.

In block, 530, a packet that carries the IoT data in the IoT standard format is generated and transmitted. For example, data converter 208 generates and transmits a packet that includes the IoT data, which has been converted into the IoT standard format, to a destination address. In the case when the IoT data includes customized data types, data converter 208 converts the customized data types into the IoT standard format. Data converter 208 transmits the packet to IoT server 121.

When it is determined that the IoT data does not comply with the standard data types (block 520-NO), an error handling procedure is performed (block 535). For example, data error handler 210 may perform a resolution process and/or an error notification process, as previously described.

Although FIG. 5 illustrates an exemplary process pertaining to the IoT unifier service of the IoT platform, according to other embodiments, process 500 may include additional operations, fewer operations, and/or different operations than those illustrated in FIG. 5, and as described herein. For example, data type verifier 206 may verify that the order of the data types included in the IoT data complies with the standard data type requirement. Additionally, or alternatively, an error handling procedure may be performed in response to an error occurring in block 505 and/or block 510.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary," as used herein means "serving as an example." Any embodiment or implementation described as "exemplary" is not necessarily to be construed as preferred or advantageous over other embodiments or implementations.

In addition, while a series of blocks has been described with regard to the process illustrated in FIG. 5, the order of the blocks may be modified according to other embodiments. Further, non-dependent blocks may be performed in parallel or simultaneously. For example, according to an exemplary implementation, two or more operations may be performed using parallel processing or a multitasking procedure. Additionally, other processes described in this description may be modified and/or non-dependent operations may be performed in parallel or simultaneously.

The embodiments described herein may be implemented in many different forms of software executed by hardware. For example, a process or a function may be implemented as "logic" or as a "component." The logic or the component may include, for example, hardware (e.g., processor 310, a sensor, etc.), or a combination of hardware and software (e.g., software 320). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow and various obvious modifications and equivalent arrangements. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 310) of a computational device. A non-transitory storage medium includes one or more of the storage mediums described in relation to memory/storage 315.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

The term "packet," as used herein, is intended to be broadly interpreted to include a data transmission or communication, the packaging of which may correspond to, for example, a packet, a cell, a frame, a datagram, some other type of container or unit of data, and/or a fragment thereof.

No element, act, or instruction described in the present application should be construed as critical or essential to the embodiments described herein unless explicitly described as such.

What is claimed is:

1. A method comprising:
  receiving, by a network device, a first packet from an Internet of Things (IoT) device, wherein the first packet carries IoT data;
  determining, by the network device, a classification of the IoT device from which the first packet is received based on data types included in the IoT data of a payload field of the first packet, wherein the classification indicates a type of IoT device;
  selecting, by the network device, standard data types assigned to the classification of the IoT device, in response to determining the classification of the IoT device;
  comparing, by the network device, the data types included in the IoT data to the standard data types assigned to the classification;
  determining, by the network device, that the IoT data includes all of the standard data types in response to a result of the comparing, and wherein the data types included in the IoT data include a customized data type;
converting, by the network device, the IoT data into an IoT standard format in response to determining that the IoT data includes all of the standard data types, wherein the IoT standard format includes all of the standard data types and the customized data type;
generating, by the network device, a second packet that includes the IoT data in the IoT standard format in response to the converting; and
transmitting, by the network device, the second packet to another network device.

2. The method of claim 1, wherein the determining the classification comprises:
reading a data type and a value of the IoT data that indicates the classification of the IoT device.

3. The method of claim 1, further comprising:
receiving, by the other network device, the second packet; and
providing, by the other network device, an IoT-based service in response to receiving the second packet.

4. The method of claim 1, wherein the determining the classification of the IoT device comprises:
extracting a data type and a value from the IoT data included in the first packet; and
performing a lookup based on the extracting, wherein the value is used to determine a correlation between the value and the classification of the IoT device.

5. The method of claim 1, wherein the IoT standard format is based on a JavaScript Object Notation format or an Extensible Markup Language format.

6. The method of claim 1, wherein the IoT device is one of a meter, a sensor, a video camera, a dongle, a smartphone, or a medical device.

7. The method of claim 1, wherein determining the classification of the IoT device further comprises:
determining, by the network device, the classification of the IoT device based on at least one of a network address or an equipment identifier of the IoT device.

8. The method of claim 1, further comprising:
adding, by the network device, one or multiple data fields and one or multiple values to the first packet based on the classification of the IoT device, wherein the one or multiple data fields and the one or multiple values pertain to a level of one or more of security, urgency, or reliability.

9. A network device comprising:
a communication interface;
a memory, wherein the memory stores instructions; and
a processor, wherein the processor executes the instructions to:
receive, via the communication interface, a first packet from an Internet of Things (IoT) device, wherein the first packet carries IoT data;
determine a classification of the IoT device from which the first packet is received based on data types included in the IoT data of a payload field of the first packet, wherein the classification indicates a type of IoT device;
select standard data types assigned to the classification of the IoT device, in response to a determination of the classification of the IoT device;
compare the data types included in the IoT data to the standard data types assigned to the classification;
determine that the IoT data includes all of the standard data types in response to a result of a comparison between the standard data types and the data types included in the IoT data, and wherein the data types included in the IoT data include a customized data type;
convert the IoT data into the IoT standard format in response to a determination that the IoT data includes all of the standard data types, wherein the IoT standard format includes all of the standard data types and the customized data type;
generate a second packet that includes the IoT data in the IoT standard format in response to a conversion of the IoT data; and
transmit, via the communication interface, the second packet to another network device.

10. The network device of claim 9, wherein when making the determination of the classification, the processor further executes the instructions to:
read a data type and a value, which is included in the IoT data, that indicates the classification of the IoT device.

11. The network device of claim 9, wherein the IoT device is one of a meter, a sensor, a video camera, a dongle, a smartphone, or a medical device.

12. The network device of claim 9, wherein when making the determination of the classification, the processor further executes the instructions to:
extract a data type and a value from the IoT data carried in the first packet; and
perform a lookup based on the extraction of the data type and the value, wherein the value is used to determine a correlation between the value and the classification of the IoT device.

13. The network device of claim 9, wherein the IoT standard format is based on a JavaScript Object Notation format or Extensible Markup Language format.

14. The network device of claim 9, wherein when making the determination of the classification, the processor further executes the instructions to:
determine the classification of the IoT device based on at least one of a network address or an equipment identifier of the IoT device.

15. The network device of claim 9, wherein the processor further executes the instructions to:
add one or multiple data fields and one or multiple values to the first packet based on the classification of the IoT device, wherein the one or multiple data fields and the one or multiple values pertain to a level of one or more of security, urgency, or reliability.

16. A non-transitory, computer-readable storage medium storing instructions executable by a processor of a computational device, which when executed cause the computational device to:
receive a first packet from an Internet of Things (IoT) device, wherein the first packet carries IoT data;
determine a classification of the IoT device from which the first packet is received based on data types included in the IoT data of a payload field of the first packet, wherein the classification indicates a type of IoT device;
select standard data types assigned to the classification of the IoT device, in response to a determination of the classification of the IoT device;
compare the data types included in the IoT data to the standard data types assigned to the classification;
determine that the IoT data includes all of the standard data types in response to a result of a comparison between the standard data types and the data types included in the IoT data, and wherein the data types included in the IoT data include a customized data type;

convert the IoT data into an IoT standard format in response to a determination that the IoT data includes all of the standard data types, wherein the IoT standard format includes all of the standard data types and the customized data type;

generate a second packet that includes the IoT data in the IoT standard format in response to a conversion of the IoT data; and transmit the second packet to another network device.

17. The non-transitory, computer-readable storage medium of claim 16, wherein the IoT device is one of a meter, a sensor, a video camera, a dongle, a smartphone, or a medical device.

18. The non-transitory, computer-readable storage medium of claim 16, wherein the instructions further comprise instructions to:

extract a data type and a value from the IoT data carried in the first packet; and perform a lookup based on the extraction of the data type and the value, wherein the value is used to determine a correlation between the value and the classification of the IoT device.

19. The non-transitory, computer-readable storage medium of claim 16, wherein the instructions further comprise instructions to:

read a data type and a value, which is included in the IoT data, that indicates the classification of the IoT device.

20. The non-transitory, computer-readable storage medium of claim 16, wherein the instructions further comprise instructions to:

provide an IoT portal service that includes software development kits for selection and use by users, wherein each of the software development kits pertains to a different classification of IoT devices;

receive a selection of one of the software development kits from an end device associated with one of the users; and transmit the one of the software development kits to the end device.

* * * * *